Sept. 12, 1967  L. L. MARRAFFINO  3,341,079
HEATING AND MIXING DEVICE FOR AEROSOL DISPENSING
Filed Dec. 17, 1965  2 Sheets-Sheet 1

INVENTOR
LEONARD L. MARRAFFINO

BY *Wynne + Funken*

ATTORNEYS

Sept. 12, 1967  L. L. MARRAFFINO  3,341,079
HEATING AND MIXING DEVICE FOR AEROSOL DISPENSING
Filed Dec. 17, 1965  2 Sheets-Sheet 2
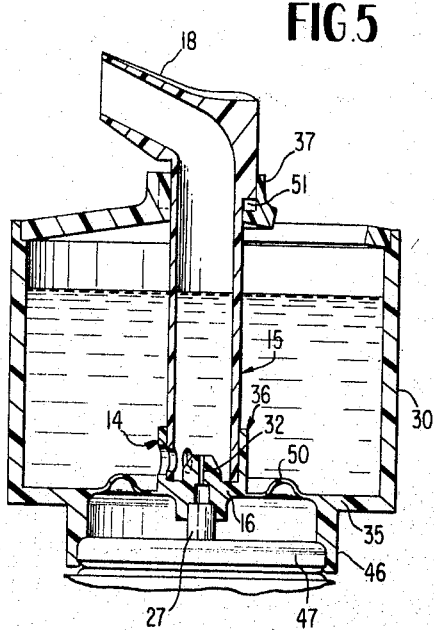
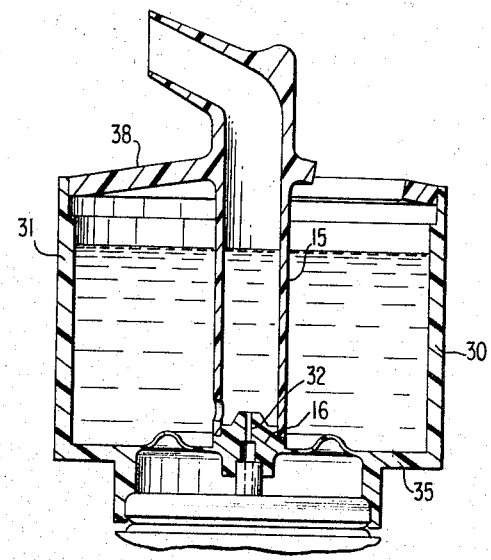
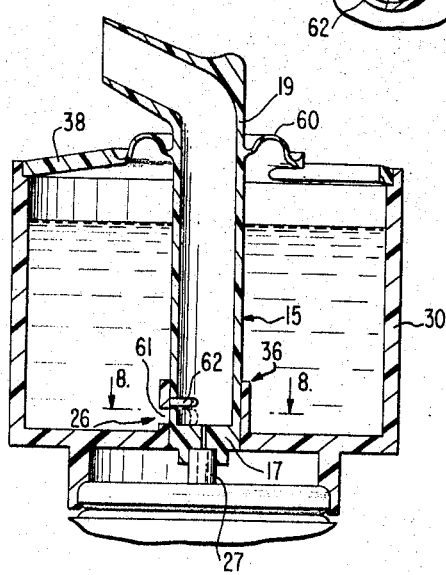
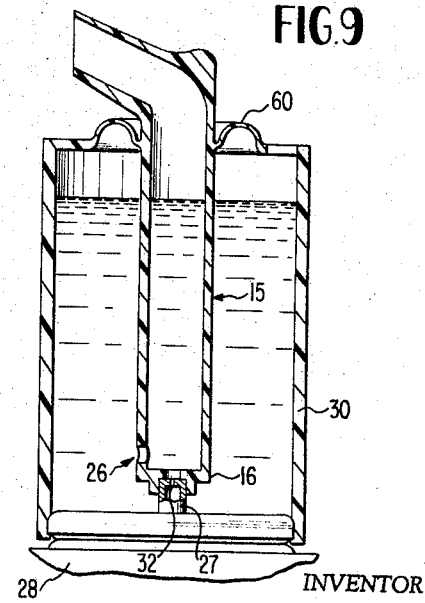
INVENTOR
LEONARD L. MARRAFFINO
BY Wynne + Finken
ATTORNEYS

United States Patent Office

3,341,079
Patented Sept. 12, 1967

3,341,079
HEATING AND MIXING DEVICE FOR AEROSOL DISPENSING
Leonard L. Marraffino, 1824 NW. 36th Court,
Fort Lauderdale, Fla. 33309
Filed Dec. 17, 1965, Ser. No. 514,448
9 Claims. (Cl. 222—136)

ABSTRACT OF THE DISCLOSURE

A mixing head for an aerosol container and the combination thereof wherein a mixing tube is provided for receiving a jet stream of foam which through apertures entrains a fluid such as hot water or the like with the stream passing as a well defined continuous turbulent flowing stream through the mixing tube to the discharge spout. The desired mixing is accomplished by the confined high velocity foam stream which entrains a predetermined amount of fluid, the amount being controllable through valve means.

---

This invention relates to a device which prepares and heats aerosol foam of the shaving cream and shampoo lather type.

A treatment of the known characteristics of such aerosol foams is found in the Reich et al. U.S. Patent No. 3,171,572.

The instant device provides an elongated mixing tube through which foam from an aerosol container is directed as a high velocity stream and into which hot water is entrained at a predetermined flow rate, the two components traveling through the tube in a highly turbulent flow pattern accomplishing uniform mixing and heating and resulting in a mixture of uniform consistency and increased temperature. The mixing tube has at its upstream end an adapter for connection to the nozzle of a pressurized aerosol container and at its downstream end a discharge spout; this elongated mixing tube is designed to have a volume significantly smaller than the normal amount of foam required for shaving or shampooing. In other words, the mixing tube is of such small cross section and overall length that the foam flows rapidly through the tube and obtains a major portion of its heat through the entrainment and mixture with hot water. Some heat, of course, is imparted to the foam by its contact with the heated wall of the tube.

The device enables the manufacturer to provide an efficiently operating heating and mixing device at a very low cost to the user. Further economic advantages are immediately recognizable by the user since the tub or tank means after use merely contains hot water and the only hold up volume or residuum in the device is the very minor amount present in the tube itself.

The manufacturer through regulation of (1) the head of water above the hot water entrainment hole means into the tube, (2) the size of this entrainment hole means, (3) the initial velocity of foam at the upstream end of the tube adjacent the hole means, (4) the consistency of the foam, and the like, or a combination thereof of these, can provide a substantially failure-proof unit for the user. Secondly, the user can be provided with a regulating means for adjusting the consistency of the resultant mixture by the provision of valve means for adjusting the flow rate of the hot water being entrained into the high velocity foam stream.

Figure 1:
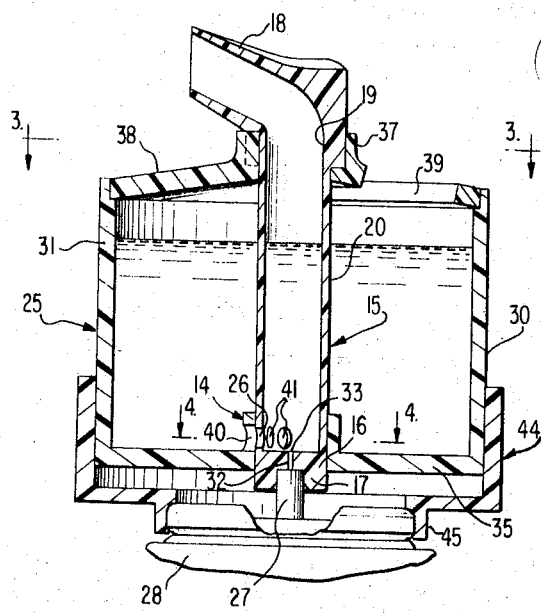
Figure 2:
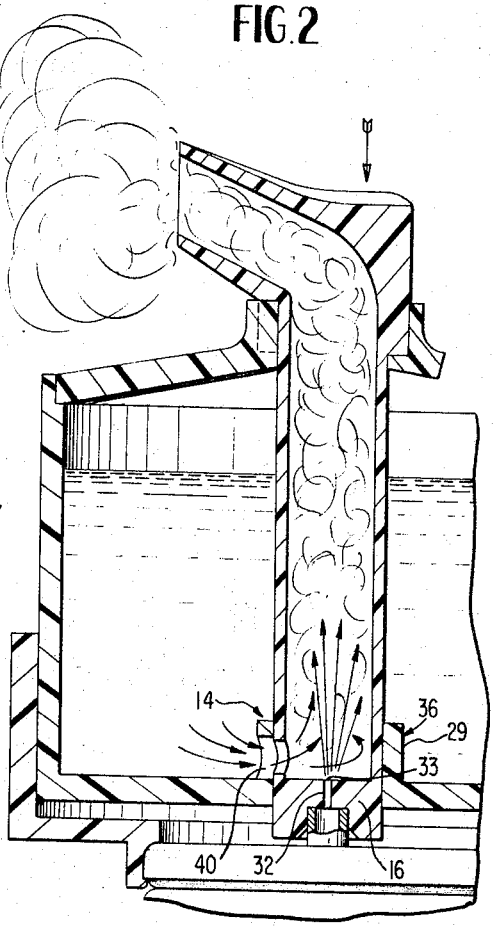
Figure 3:
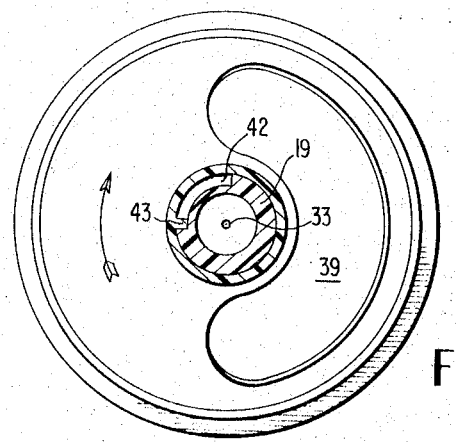
Figure 4:
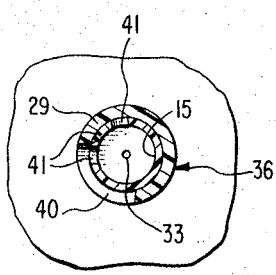

These and further objects and advantages of the present invention will become more apparent upon reference to the following specification, appended claims and drawings wherein:

FIG. 1 is a side elevational view of the device in cross section mounted on an aerosol container;
FIG. 2 is an enlarged view of a portion of FIG. 1 with the piston member of the device moved downwardly to accomplish discharge;
FIG. 3 is a cross sectional view taken on line 3—3 of FIG. 1;
FIG. 4 is a cross section taken on line 4—4 of FIG. 1;
FIG. 5 is a view similar to FIG. 1 of a second embodiment;
FIG. 6 is a view similar to FIG. 1 of a third embodiment;
FIG. 7 is a view similar to FIG. 1 of a fourth embodiment with the tube in closed non-discharging condition;
FIG. 8 is a cross sectional view taken on line 8—8 of FIG. 7 with the tube depressed to discharge condition; and
FIG. 9 is a view similar to FIG. 1 of a fifth embodiment.

Referring to FIGS. 1-4, the elongated mixing tube 15 is shown as having an adapter 16 at its upstream end 17 and a spout 18 at its downstream end 19, the spout 18 extending at about a 25 degree angle from the horizontal and having a large concave curvature to smoothly control flow outwardly from the cylindrical member 20 at the intermediate portion of the tube. Means 25 is provided for supplying hot water to the upstream end of the tube 15 and in the embodiment shown this means 25 includes a hole means 26 through the wall of the tube 15. The adapter 16 of the tube seats on the nozzle 27 of the aerosol container 28 and upon downward movement thereof foam is projected at a high velocity into the tube, thereby entraining hot water initially into the peripheral surface portion of the foam stream which, as depicted in FIG. 2, results in a swirling, turbulent mixing of the two components as the combined stream travels rapidly through the mixing tube to final discharge at the spout. As previously mentioned, the mixing tube 15 has a significantly smaller volume than the predetermined batch volume of the mixture intended to be normally discharged for shaving or shampooing or the like whereby upon cessation of the discharge operation, a holdover or residuum of mixture of a minor amount is present in the tube 15 with the hot water in the tank means 30 remaining substantially clear of traces of foam. The device, therefore, wastes a negligible amount of foam resulting in consumer satisfaction and minor after-flow problems, that is, minor emergence from the spout 18 following use.

Preferably, the high velocity of the foam is accomplished by the provision of a jet means 32 which in the embodiment of FIGS. 1-4 is provided as a jet opening 33 in the center of the adapter 16, this opening 33 preferably being equivalent in transverse area to an opening about 0.035 inch in diameter.

Numerous types of nozzles 27 employed in aerosol containers have a somewhat standardized opening of about 0.070 inch in diameter and it has been found that the production of a jet through the jet means 32 significantly improves the heating and mixing capabilities of the instant device.

The hot water means 25 is in the form of a tank means 30 and hole means 26 through the wall of the mixing tube 15 at its upstream end 17, the tank means shown having an annular wall 31 surrounding the cylindrical mixing tube 15 with an integral bottom 35 having a bearing 36 (FIG. 4) therein for rotatably receiving the mixing tube 15, the downstream end 19 of the mixing tube being rotatably received in a top bearing 37 in an open top member 38. The top member 38 is shown as being a separate element from the wall 31 of the tank means to facilitate assembly; however, in use the top member need not be removed since the user can merely use the top opening 39 for placing hot water in the unit and then discharging same. The lower bearing 36 includes an upstanding annular ring 29 having, as seen in FIG. 4, a horizontal slot 40 therethrough which cooperates with apertures 41 in the tube 15 to provide the hole means 26 for valving or controlling the flow rate of hot water into the tube, the combination being identifiable also as valve means 14. Rotation of the tube 15 counterclockwise from the position shown in FIG. 4 will change the one-hole setting to a two-hole or three-hole setting. The downstream end 19 of the tube, that is, the portion at the spout 18, includes, as seen in FIG. 3, a peripheral annular slot 42 which cooperates with a radial lug 43 extending inwardly thereinto from the top bearing to limit the rotational movement of the tube. Suitable indicia would identify the positions for the user; holes of various sizes could be employed.

The device shown in FIG. 1 has an outer cylinder 44 which is snapped onto the top rim of the aerosol container 28 through a wedge flange 45, the upper portion of the cylinder receiving the tank means 30 which operates as a piston therein.

FIG. 5 shows a second embodiment of the device wherein similar parts are similarly numbered, this procedure being used hereinafter for the other embodiments.

The device of FIG. 5 includes the hot water regulation or valving feature of FIG. 1 but eliminates the need for the outer cylinder 44, thereby reducing the parts required. In this modification, the bottom 35 of the tank means 30 includes a depending annular wedge flange 46 which snaps onto the container rim 47. The bottom includes a bottom resilient member 50 which is integral with the adapter 16, jet means 32 and the bearing 36. It will be noted that the adapter 16 of the tube 15 in this design is that portion of the tube which seats into the bearing 36 and that while the elements for valving the hot water flow are similar to FIG. 1, the tube 15 along with the adapter, jet means and bearing reciprocate relative to the tank means 30, a space 51 being shown under the spout 18 in the top bearing 37 enabling the tube 15 to move downwardly for actuation of the nozzle 27.

FIG. 6 shows a third embodiment which has no valve means 14 for hot water control but which otherwise has a bottom 35 for the tank means 30 similar to that of FIG. 5 except for the elimination of the bearing. The adapter 16 is firmly wedged onto or bonded to the jet means 32. In this design, the top member 38 is integral with the tube 15 and acts as a piston in the annular wall 31 of the tank means 30 for guided reciprocating movement of the tube for nozzle actuation.

FIGS. 7 and 8 show a fourth embodiment wherein no adjusting type valve means 14 for the hot water is provided and wherein the mixing tube 15 is maintained out of fluid communication with the tank means 30 until foam is discharged from the nozzle 27 into the tube 15. This is accomplished through the provision of a top resilient member 60 as a connection between the downstream end 19 of the tube and the top member 38 with the upstream end 17 of the tube positioned in bottom bearing 36. The bearing 36 has an opening 61 therein which cooperates with an opening 62 in the tube 15 to provide the hole means 26 for conducting hot water to the tube only when the tube is depressed. When the tube 15 is in its nondischarge condition as shown, the opening 62 therein is raised into shut-off alignment with the side wall of the bearing 36. FIG. 8 shows the alignment of the openings 61 and 62 when the tube 15 is depressed for discharge.

FIG. 9 shows the fifth embodiment wherein the device is shown as a single part employing top resilient member 60 similar to FIG. 7 enabling reciprocating movement of the tube 15 within the tank means 30 which is rigidly clamped to the container. The adapter 16 of the tube 15 seats on the nozzle 27 of the container 28; the nozzle 27 has been provided with the jet means 32 for providing high speed flow of the foam on discharge. Hole means 26 is provided for entrainment of water as the foam passes. In this embodiment, the top wall of the container 28 enclosed by the tank means 30 serves as a bottom for the tank means.

Under certain circumstances, it will be understood that a closed removable top may be employed; the utilization of the open top shown provides considerable advantage and ease in use. As stated, the mixing head brings about an effective mixture of a fluid-like primary material with a fluid-like secondary material, utilizing the energy of the discharged primary material to accomplish turbulent mixing in an elongated mixing tube having a minimum volume compared to the volume of foam mixture required for the intended use thereof. Preferably, the cylindrical intermediate portion of the tube is about 1½ inches long and has a transverse area equivalent to an opening about 0.156 inch in diameter.

While the invention has been described with reference to certain embodiments, they are to be considered illustrative rather than limiting, and it is intended to cover all further embodiments that fall within the spirit and scope of the appended claims.

I claim:

1. A mixing head for mixing foam discharged from the nozzle of a pressurized aerosol container with a fluid such as hot water or the like, comprising: an elongated mixing tube having an adapter at its upstream end connected to the nozzle of the container, aperture means, and a spout at its downstream end; jet means for producing a high velocity stream of foam through said mixing tube; tank means for said fluid in fluid communication with said aperture means of said mixing tube for enabling the entrainment of said fluid by said high velocity stream of foam, said mixing tube being of a predetermined size to define an elongated enclosed turbulent mixing zone wherein the foam and entrained fluid form a well defined continuous turbulent flowing stream.

2. A mixing head as defined in claim 1 and including valve means for regulating said fluid communication between said tank means and said aperture means to control the entrainment flow rate of the fluid.

3. A mixing head as defined in claim 2 and wherein said tank means includes a bearing for rotatably receiving the upstream end of said mixing tube, said valve means being provided by said aperture means and means on said bearing for regulating the flow rate of the fluid.

4. A mixing head as defined in claim 3 and wherein said mixing tube includes a cylindrical member upstream of said spout and said tank means includes an annular container having a bottom wall, said bearing being formed centrally in said bottom wall.

5. A mixing head as defined in claim 1 and wherein said jet means has a jet opening equal in transverse area to an opening about 0.035 inch in diameter, and wherein a major portion of said mixing tube is cylindrical and has a transverse open area equivalent to an opening about 0.156 inch in diameter and wherein said major portion is about 1½ inches long.

6. A mixing head as defined in claim 1 and wherein said jet means is located at said adapter and wherein said tank means includes a bottom resilient member connected to said adapter whereby upon said mixing tube being actuated to open the container nozzle, the resilient member is distorted.

7. A mixing head as defined in claim 1 and wherein said tank means includes a top resilient member connected to said mixing tube whereby upon said mixing tube being actuated to open the container nozzle, the resilient member is distorted.

8. A device comprising a pressurized aerosol container having a nozzle and a jet means in said nozzle for producing a high velocity stream of foam; and a mixing head for mixing the foam with a fluid, such as hot water or the like; including an elongated mixing tube having an adapter at its upstream end connected to the nozzle of the container, aperture means, and a spout at its downstream end; tank means for said fluid in fluid communication with said aperture means of said mixing tube for enabling the entrainment of said fluid by said high velocity stream of foam, said mixing tube being of a predetermined size to define an elongated enclosed turbulent mixing zone wherein the foam and entrained fluid form a well defined continuous turbulent flowing stream.

9. A mixing head as defined in claim 8 and wherein said tank means includes a top resilient member connected to said mixing tube whereby upon said mixing tube being actuated to open the container nozzle, the resilient member is distorted.

References Cited
UNITED STATES PATENTS

| | | | |
|---|---|---|---|
| 1,827,649 | 10/1931 | Gallipoli et al. | 222—146 |
| 2,873,351 | 2/1959 | Lannert | 222—146 X |
| 3,171,572 | 3/1965 | Reich et al. | 222—146 |
| 3,217,938 | 11/1965 | Ayres | 222—146 |
| 3,263,744 | 8/1966 | MacKeown | 222—146 |

WALTER SOBIN, *Primary Examiner.*